United States Patent [19]
von Niederhäusern

[11] Patent Number: 5,893,989
[45] Date of Patent: Apr. 13, 1999

[54] LASER MACHINING DEVICE, IN PARTICULAR FOR MACHINING TRACK RODS

[75] Inventor: Rudolf von Niederhäusern, Tschingel, Switzerland

[73] Assignee: Lasag AG, Thun, Switzerland

[21] Appl. No.: 08/838,124

[22] Filed: Apr. 15, 1997

[30] Foreign Application Priority Data

Feb. 19, 1997 [EP] European Pat. Off. .............. 97102649

[51] Int. Cl.⁶ .................................................. B23K 26/00
[52] U.S. Cl. ..................... 219/121.77; 219/121.74; 219/121.6
[58] Field of Search .................... 219/121.6, 121.63, 219/121.67, 121.68, 121.7, 121.73, 121.74, 121.75, 121.76, 121.77, 121.78, 121.79, 121.84

[56] References Cited

U.S. PATENT DOCUMENTS

| | | |
|---|---|---|
| 3,524,046 | 8/1970 | Brouwer .................... 219/121.7 |
| 4,083,629 | 4/1978 | Kocher et al. ............. 219/121.63 |
| 4,223,202 | 9/1980 | Peters et al. .............. 219/121.63 |
| 4,346,284 | 8/1982 | Grollimund et al. ........ 219/121.7 |
| 4,662,708 | 5/1987 | Bagdal ...................... 219/121.76 |
| 4,701,591 | 10/1987 | Masaki et al. ............. 219/121.77 |
| 4,729,766 | 3/1988 | Bergentz et al. .......... 219/121.69 |
| 4,820,899 | 4/1989 | Hikima et al. ............. 219/121.76 |
| 4,972,062 | 11/1990 | Aharon ...................... 219/121.78 |
| 5,302,798 | 4/1994 | Inagawa et al. ............ 219/121.7 |
| 5,500,506 | 3/1996 | Lawson ..................... 219/121.67 |

FOREIGN PATENT DOCUMENTS

| | | | |
|---|---|---|---|
| 57-100889 | 6/1982 | Japan | 219/121.76 |
| 60-44192 | 3/1985 | Japan | 219/121.74 |
| 60-199585 | 10/1985 | Japan | 219/121.74 |
| 61-17392 | 1/1986 | Japan | 219/121.74 |
| 62-8271 (B2) | 2/1987 | Japan | 219/121.73 |
| 63-126688 | 5/1988 | Japan | 219/121.73 |

*Primary Examiner*—Gregory L. Mills
*Attorney, Agent, or Firm*—Griffin, Butler Whisenhunt & Szipl

[57] ABSTRACT

The laser device (2) includes a frontal housing (4) arranged to receive a laser beam (8) at its input opening (6). Within the frontal housing (4) are provided optical guiding devices for the incoming laser beam (8) which define optical paths (10, 12) leading from the input opening (6) to two machining heads (14, 16) arranged so that the two optical paths are extended respectively within the two machining heads up to the respective output openings of the latter. The two optical paths (10, 12) respectively leaving the two machining heads (14, 16) define two optical axes (22, 24) which cross each other and together define a machining plane. The laser machining device (2) is particularly suited to machining connecting rods for engines.

11 Claims, 4 Drawing Sheets

LASER MACHINING DEVICE, IN PARTICULAR FOR MACHINING TRACK RODS

The present invention concerns a laser machining device able to be used advantageously for machining connecting rods for making engines.

According to a technique used for manufacturing connecting rods, the rods are formed first in a single metal piece having two transverse openings, a first opening for fixing to a piston and a second opening for fixing to the transmission shaft for driving in particular an internal combustion engine. However, in order to be able to arrange the connecting rods on a shaft which transforms the mechanical movement of the rotors into a rotating movement of the wheels of the vehicle, it is necessary to cut the connecting rods formed initially of a single piece at the location of the second opening provided for the insertion of said transmission shaft.

In order to cut the connecting rods along a median plane, i.e. a plane comprising the central geometrical axis of said second opening, the man skilled in the art knows to use a mobile laser head, in particular a pivoting head, to machine in the wall of the second opening, prior to cutting the rods, two transverse or axial grooves, i.e. oriented along the direction of said central geometrical axis.

In a known laser machining technique, the laser head is oriented first for machining a first groove, such machining being effected by a first movement of translation of said head along the central geometrical axis of said second opening. Next, the laser head is moved, undergoing, in particular a rotation, to be oriented so as to be able to machine a second groove in the wall of the second opening diametrically opposite the first groove. Finally, by a second axial movement of translation, this second groove is machined by means of the laser beam provided by the laser machining head.

A connecting rod machining method of this type for cutting the rods has drawbacks and limitations, in particular as regards the machining speed. First, since the machining head must be mobile and able to move during machining in order to be able to machine the two diametrically opposite grooves in the inner wall of the opening where the cutting is to be performed, it is necessary to connect the machining head to the source generating the laser beam by means of a flexible fiber optic cable. The use of a fiber optic cable for transmission of the laser beam from the laser source to the machining head has various drawbacks and in particular beam focusing problems given that passage of the beam via a fiber optic cable generates spatial dispersion of the laser beam relative to the spatial distribution of the laser beam originating from the laser source. The effect of the beam focusing problems resulting from this spatial dispersion is a reduction of the machining efficiency which thereby increases the laser power necessary for machining the aforementioned grooves.

Secondly, the displacement of the laser machining head during machining of a connecting rod necessitates a relatively complex mechanical arrangement and further increases the machining time of each connecting rod. As a minimum, with such a machining device, the machining head has to undergo two axial movements of translation and at least one movement of rotation. In the event that the machining of the grooves is preferably performed from top to bottom so that the material removed does not fill the groove again, the number of movements of translation of the machining head is at least three.

An aim of the present invention is to overcome the aforementioned drawbacks by providing a laser machining device allowing machining with a high level of efficiency and accuracy, in particular machining of connecting rods for engines, prior to cutting such rods to mount them on a transmission shaft.

The present invention therefore concerns a laser machining device comprising a housing arranged to receive at an input opening a laser beam provided by a laser source, characterised in that it includes optical guiding means for said incoming laser beam which are arranged in said housing and which define first and second optical paths in such housing leading respectively from said input opening to first and second machining heads fixed to said housing and arranged so that said first and second optical paths are extended respectively within such first and second machining heads up to the respective output openings of the latter, said first and second optical paths defining first and second optical axes which cross each other and together define a machining plane, upon leaving said first and second machining heads.

As a result of the features of the laser machining device according to the invention, two laser beams may be generated from a single laser beam entering the housing of the device, these two laser beams propagating, at the output opening of the two machining heads, along two different directions, namely said first and second optical axes, which cross each other and define a machining plane thus allowing two diametrically opposite grooves to be simultaneously machined in the inner wall of an opening, in particular in a connecting rod opening.

However, it will be noted that it is possible, according to other features of the invention which will be described in more detail hereinafter, to machine the two grooves one after the other without having to move the two machining heads relative to the housing.

The connecting rod machining installation using the laser machining device according to the invention may be arranged so that only vertical movements of translation of the housing relative to the machined parts are provided. This feature in itself alone constitutes a major advantage relative to the prior art.

Of course, the man skilled in the art will understand that in order to avoid using a fiber optic cable between the laser source and the housing, the laser source may be permanently fixed to such housing. However, the man skilled in the art may envisage other alternative embodiments, in particular with a source which remains still while the housing and the heads are mobile during the various machining steps by using return mirrors defining at least partially a vertical optical path the length of which varies during vertical movements of translation of the housing. However, in certain cases and in particular with connecting rods, it is the machined parts which are moved while the laser machining device according to the invention remains still, no part of such device undergoing any movement whatsoever.

The present invention will be described in more detail hereinafter with the aid of the description which follows, made with reference to the attached drawings, given by way of non-limiting examples, in which.

Figure 1:
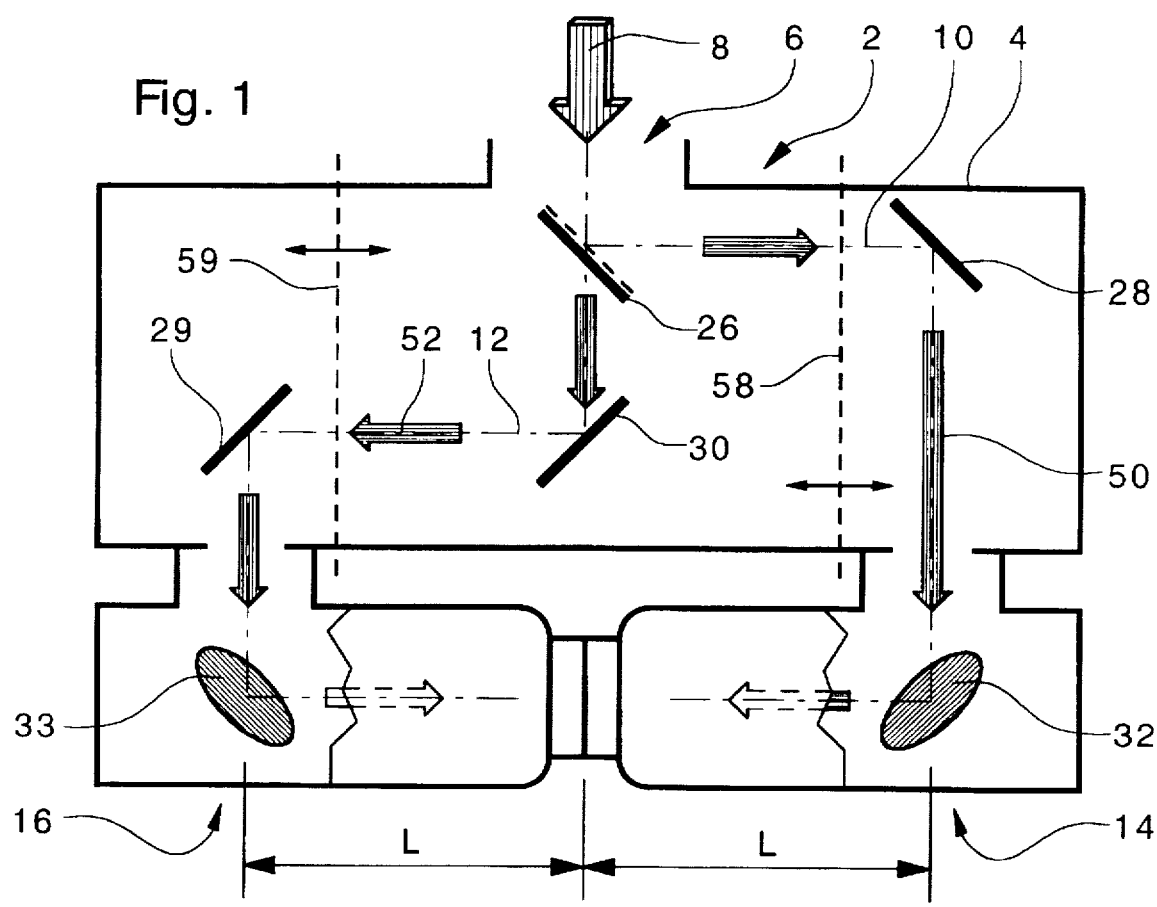
FIG. 1 is a partially open schematic top view of a laser machining device according to a first embodiment of the invention.

A first embodiment of the invention will be described hereinafter with the aid of FIGS. 1 and 2.

The laser machining device 2 comprises a frontal housing 4 with an input opening 6 for a laser beam 8 provided by a conventional laser source which is not shown. Within housing 4 optical guiding means for incoming laser beam 8 are arranged so as to define first and second optical paths 10 and 12. The two distinct optical paths 10 and 12 lead from input opening 6 respectively to a first machining head 14 and a second machining head 16. These first and second machining heads 14 and 16 are fixed to frontal housing 4 by means known to the man skilled in the art so that the first and second optical paths are respectively extended within such first and second machining heads up to output openings 18 and 20 of the latter. The first and second heads are arranged so that optical paths 10 and 12 extending respectively into heads 14 and 16 define first and second optical axes 22 and 24 which cross each other and which together define a machining plane of the laser machining device according to the invention.

The optical guiding means situated within housing 4 are formed of a first semi-transparent mirror 26 and three plane mirrors 28, 29 and 30. It will be noted that any other optical means known to the man skilled in the art may be used within the framework of the present invention. Within each of the two heads 14 and 16 is provided a mirror 32, 33 used to change the direction of optical path 10, 12 coming from housing 4 along a longitudinal direction of head 14, 16. The two longitudinal directions of heads 14 and 16 are respectively identical to optical axes 18 and 20 in the embodiment described here. However, this simple and advantageous construction is by no means limiting.

Machining heads 14 and 16 comprise respectively first and second focusing means 36 and 38 for the laser beams propagating respectively along optical axes 22 and 24.

The two machining heads 14 and 16 are connected to each other by means of a common end piece 40, machined so as to define two inner channels 42 and 44 of conical shape. Two nozzles 46 and 48 extend the two conical channels 42 and 44 so that such nozzles 46 and 48 and conical channels 42 and 44 have longitudinal axes which are respectively identical to each other and to optical axes 22 and 24.

Incoming laser beam 8 is divided into two secondary laser beams 50 and 52 by semi-transparent mirror 26 which acts as an optical divider. Thus, in the embodiment shown in FIGS. 1 and 2, the two heads 14 and 16 each simultaneously receive a secondary laser beam 50, 52 the intensity of which is substantially equal to half the intensity of incoming laser beam 8.

In order to be able to inject a pressurised gas flow jointly with the secondary laser beams at the output openings of the two nozzles 46 and 48 provided particularly for this purpose, means are provided for introducing a gas into channels 42 and 44, these means being formed by two pipes (not shown) connecting the two channels 42 and 44 respectively to two nipples 54 and 56.

In FIG. 1, the two dotted lines 58 and 59 indicate in a schematic manner that the distance L may be varied according to machining requirements. In other words, the horizontal spacing separating the two heads 14 and 16 is variable. Of course, for each specific spacing a corresponding common end part 40 is provided. Finally, in an alternative embodiment, it is possible also to provide adjustment of the direction of optical axes 22 and 24 in the working plane, such plane being vertical in the present embodiment. In order to do this, heads 14 and 16 may, during assembly or adjustment of their position, undergo a rotation in a vertical plane. Thus, for each specific machining, the angular staggering between the directions defined by optical axes 22 and 24 may be selected just like the spacing between output openings 18, 20 of nozzles 46 and 48. It will be noted that, given that such an installation is generally dedicated to a specific machining operation determined in advance, the spacing between machining heads 14 and 16 and the orientation of the latter in the working plane are determined when the device according to the invention is assembled.

Figure 2:
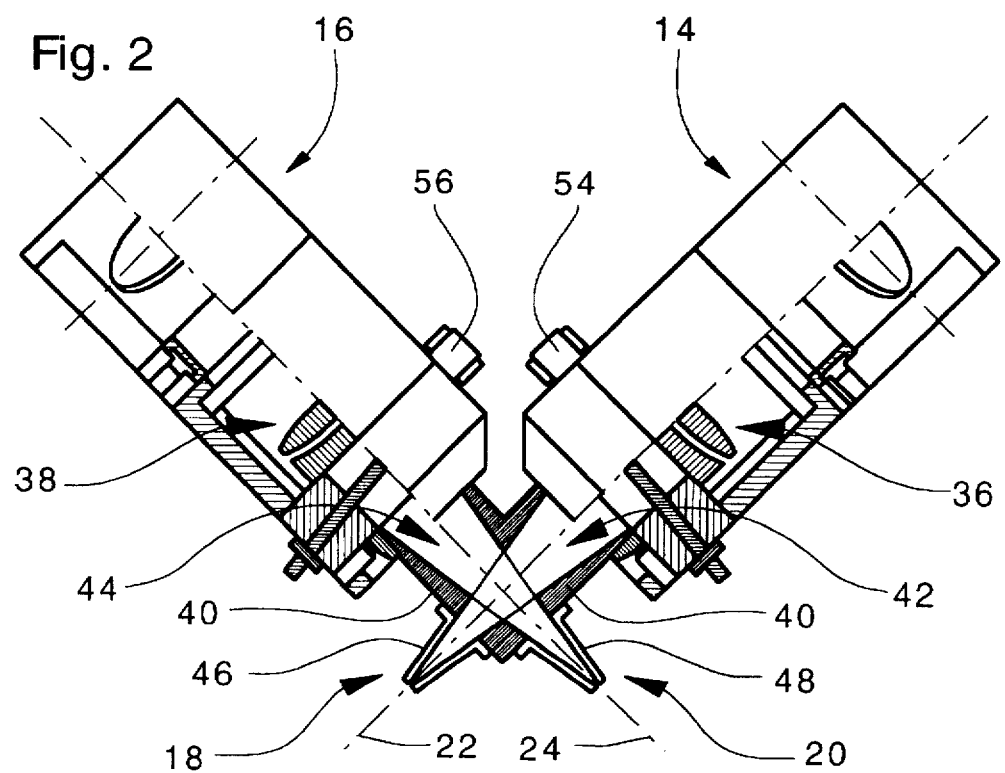
FIG. 2 is a partial schematic front view, partially open, of the device shown in FIG. 1.

Housing 4 has not been shown in FIG. 2 to avoid unnecessarily overloading the drawing.

Figure 3:
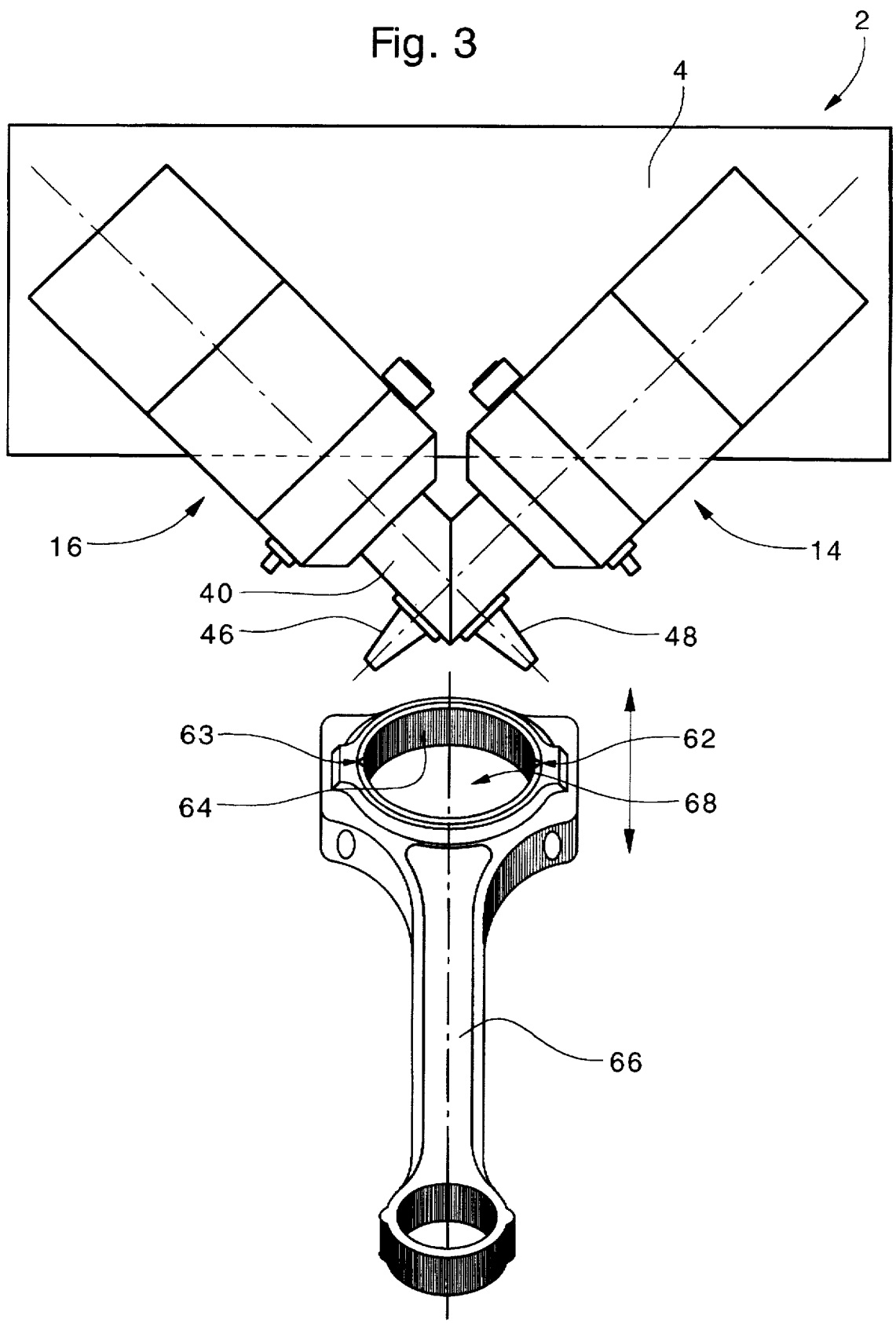
FIG. 3 shows schematically the device of FIGS. 1 and 2 used in a connecting rod machining application.

FIG. 3 shows laser machining device 2 which is described hereinbefore and arranged in an installation for machining connecting rods, in particular connecting rods for internal combustion engines in the automobile industry. The connecting rods are initially formed in a single cast iron piece requiring cutting along a plane which is transverse to opening 68 provided for mounting the connecting rods onto a transmission shaft. In order to assure cutting along a determined plane, two grooves 62 and 63 are machined with the aid of the laser installation in inner wall 64 of connecting rod 66. In order to do this, housing 4 and connecting rod 66 are moved in relation to each other so as to effect the machining of grooves 62 and 63. The machining of the two grooves may be effected by a single movement of translation, preferably from top to bottom relative to connecting rod 66. However, it is also possible to machine in several passes if necessary and in particular when nozzles 46 and 48 are withdrawn from opening 68 of connecting rod 66.

Figure 4:
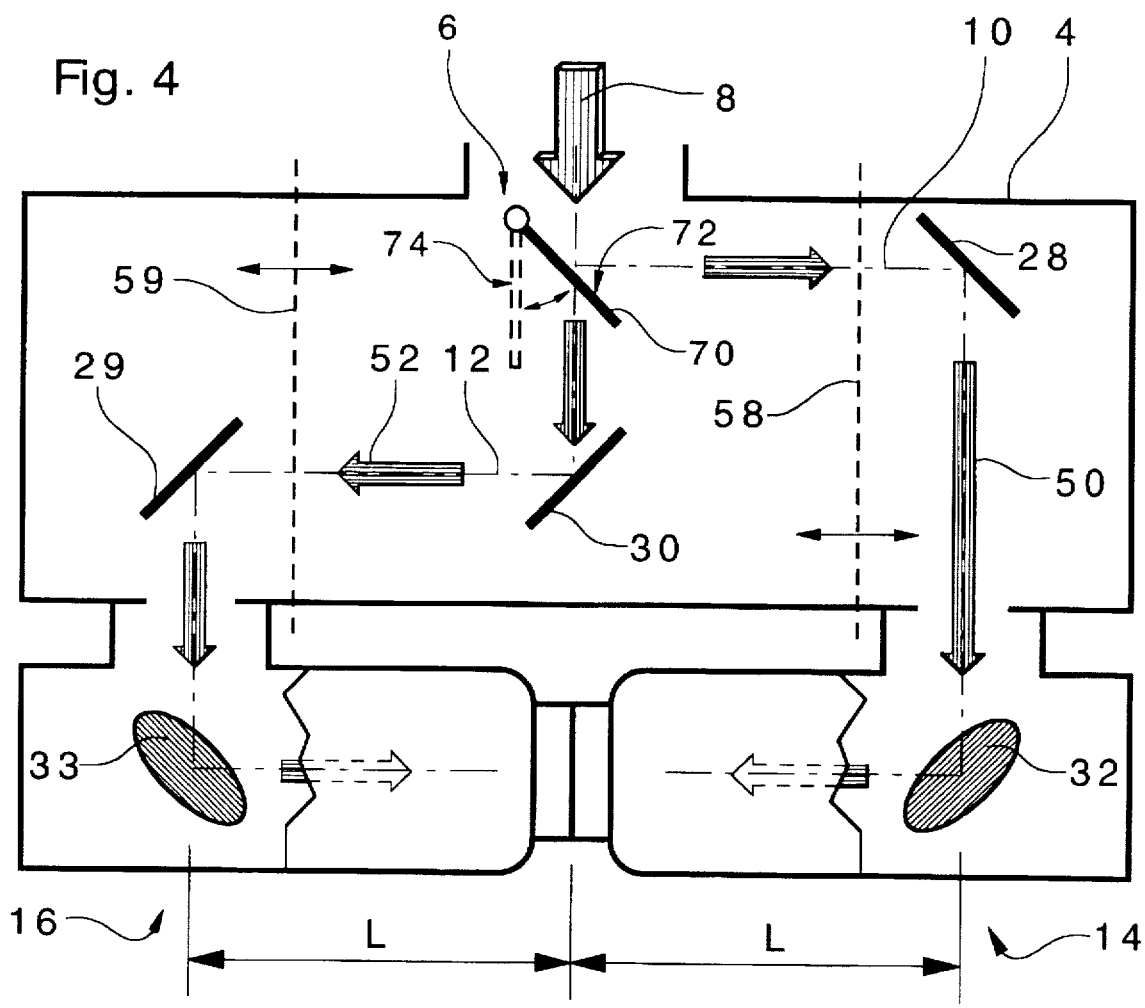
FIG. 4 is a partially open schematic top view of an alternative of the first embodiment.

FIG. 4 shows an alternative of the first embodiment according to the invention. The references already described hereinbefore will not be described again here in detail. This alternative embodiment differs from the embodiment shown in FIG. 1 in that semi-transparent mirror 26 is replaced in FIG. 4 by a mirror 70 which can be switched electrically between a first position 72 deviating incoming laser beam 8 onto first optical path 10 and a second position 74 leaving incoming laser beam 8 to propagate along second optical path 12. Thus, in this embodiment, machining heads 14 and 16 may work separately in time and in particular alternately, which may be advantageous for certain applications, in particular because the intensity of secondary laser beams 50 and 52 have the same instantaneous intensity as incoming laser beam 8.

This alternative is also advantageous because one is no longer constrained by the diameter of the opening of the connecting rods given that such rods may be moved in a plane perpendicular to the plane of symmetry of the two heads at the same time that mirror 70 is switched between the two positions 72 and 74. Thus, with the same machining device, it is possible to machine parts of various dimensions while maintaining the advantages of the present invention.

Figure 5:
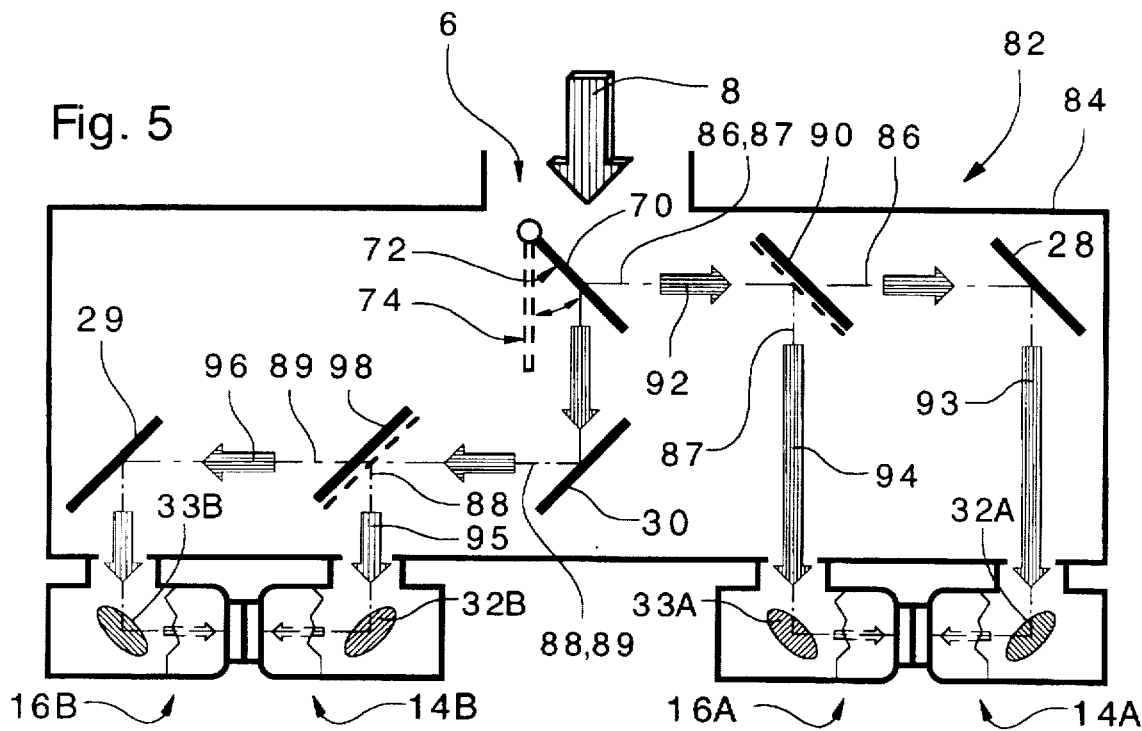
FIG. 5 is a partially open schematic top view of a second embodiment of a device according to the invention.

FIG. 5 shows a second embodiment of a laser machining device according to the invention.

Such device 82 comprises a housing 84 having an input opening 6 for an incoming laser beam 8. Within housing 84 are arranged optical guiding means defining four optical paths 86, 87, 88 and 89 guiding secondary laser beams from said input opening 6 to four machining heads 14A, 16A, 14B and 16B. Heads 14A and 16A, 14B and 16B respectively are identical to machining heads 14 and 16 described in connection with the first embodiment of the invention. The two heads 14A and 16A form a first operating group and the two heads 14B and 16B form a second operating group. Each of such first and second operating groups operates in a similar manner to the operating group formed by the two heads 14 and 16 described in connection with the first embodiment. The two operating groups of the present embodiment allow machining of two parts, in particular two connecting rods, in parallel. The arrangement of heads 14A, 14B, 16A and 16B will not be described again here given that it is similar to that described hereinbefore in connection with the first embodiment.

Optical paths 86 and 87 have a common portion between electrically switching mirror 70 and a semi-transparent mirror 90. This mirror 90 divides the luminous intensity of the incident beam 92 into two secondary beams 93 and 94 propagating respectively along optical paths 86 and 87. Secondary beams 93 and 94 are respectively deviated by mirrors 32A and 33A along the longitudinal axes of the two heads 14A and 16A. When mirror 70 is switched into position 74, incoming laser beam 8 is first deviated by mirror 30 and is then divided into two secondary beams 95 and 96 by a semi-transparent mirror 98. Secondary beam 96 is then deviated by mirror 29 to enter head 16B where it is deviated by mirror 33B along the longitudinal axis of such head 16B. Secondary beam 95 enters head 14B where it is deviated by mirror 32B along the longitudinal axis of such head 14B.

The device according to the second embodiment described here allows machining of two parts, in particular two engine connecting rods, in parallel or alternately in a rapid and efficient manner.

Figure 6:
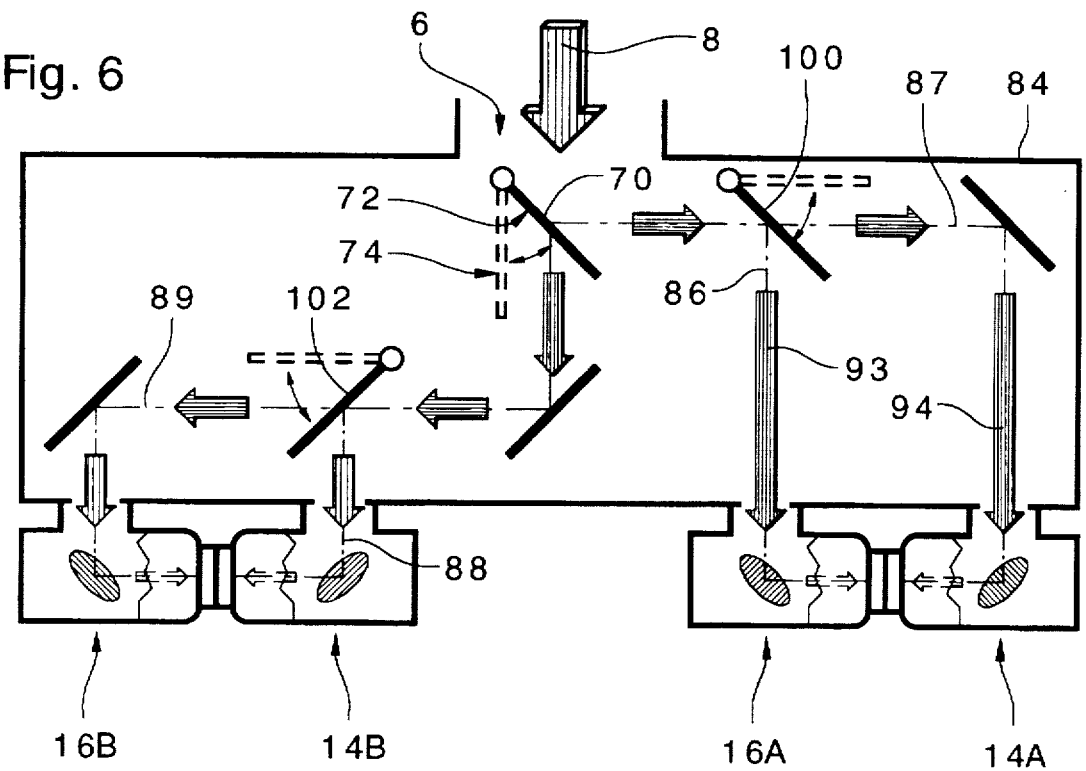
FIG. 6 is a partially open schematic top view of an alternative of the second embodiment.

FIG. 6 shows an alternative of the second embodiment. This alternative differs from that of FIG. 5 in that semi-transparent mirrors 90 and 98 are respectively replaced by two mirrors 100 and 102 which are able to switch electrically. This alternative allows incoming laser beam 8 to be led selectively to one of the four heads 14A, 16A, 14B and 16B.

The references of FIG. 6 which have already been described previously will not be described again here.

In another alternative which is not shown, electrically switching mirror 70 is replaced by a semi-transparent mirror dividing incoming laser beam 8 into two secondary beams.

While remaining within the scope of the present invention, it is possible to arrange N machining heads with N being greater than 4, and in particular with N being an even number so as to form N/2 operating groups of two heads according to the invention.

I claim:

1. Laser device for machining an inner wall of an opening or a cavity comprising a frontal housing arranged to receive at an input opening an incoming laser beam provided by a laser source, optical guiding means for said incoming laser beam which is arranged in said frontal housing and which defines first and second optical paths leading from said input opening to first and second machining heads fixed to said frontal housing and arranged so that said first and second optical paths are extended respectively within said first and second machining heads up to respective output openings of said machining heads, said first and second optical paths defining first and second optical axes which cross each other and together define a machining plane, upon leaving said first and second machining heads, said first and second heads comprising first and second focusing means arranged respectively along said first and second optical paths, said device being characterised in that said first and second heads are connected to each other by common end means defining two inner channels which cross each other, central axes of said two inner channels being respectively identical to said first and second optical axes.

2. Device according to claim 1, characterised in that said inner channels of said common end means are respectively extended by two nozzles.

3. Device according to claim 2, characterised in that it is provided with means for introducing a pressurised gas into the two inner channels to generate a gas flow at the output openings of the two nozzles.

4. Device according to claim 1, characterised in that a spacing between said first and second heads may be adjusted.

5. Device according to claim 1, characterised in that said first and second heads are arranged so as to be able to define an orientation of each of said first and second heads in a machining plane comprising said first and second optical axes.

6. Device according to claim 1, characterised in that said optical guiding means is formed of an optical divider which divides said incoming laser beams into two secondary beams which are respectively led to said first and second heads by means of mirrors.

7. Device according to claim 1, characterised in that said optical guiding means is formed by a mirror able to switch electrically between a first position deviating said incoming laser beam onto said first optical path and a second position allowing such incoming laser beam to propagate along said second optical path.

8. Device according to claim 1, characterised in that it comprises N machining heads, N being greater than 2, said optical guiding means defining N optical paths leading said incoming laser beam respectively from said input opening of said frontal housing to said N machining heads.

9. Device according to claim 8, characterised in that N is an even number, said N heads being separated into N/2 operating groups of two machining heads arranged in a similar manner to said first and second heads.

10. Device according to claim 9, characterised in that said optical guiding means is arranged so as to lead said incoming laser beam selectively to any of said operating groups, each of the two heads of any same operational group receiving in substantially equal parts a luminous intensity provided to this same operating group.

11. Device according to claim 9, characterised in that said optical guiding means is arranged so as to lead said incoming laser beam selectively to any one of said N machining heads.

* * * * *

UNITED STATES PATENT AND TRADEMARK OFFICE
CERTIFICATE OF CORRECTION

PATENT NO. : 5,893,989
DATED : April 13, 1999
INVENTOR(S) : Rudolf Von Niederhäusern and Gerhard Bunting It is certified that error appears in the above-identified patent and that said Letters Patent is hereby corrected as shown below:

<u>Title page,</u>
Item [75], Inventors, should read -- Rudolf von Niederhäusern, Tschingel, Switzerland and Gerhard Bunting, Thun, Switzerland --.

Signed and Sealed this

Second Day of May, 2006

JON W. DUDAS
*Director of the United States Patent and Trademark Office*